June 23, 1959  H. FOSBURGH  2,891,693
METER TROUGHS
Filed Oct. 4, 1957

Inventor
Herman Fosburgh
by Roberts, Cushman & Grove
Att'ys

United States Patent Office 2,891,693
Patented June 23, 1959

2,891,693
METER TROUGHS

Herman Fosburgh, Manchester, N.H., assignor to Anchor Manufacturing Company, Boston, Mass., a corporation of Massachusetts Application October 4, 1957, Serial No. 688,344

4 Claims. (Cl. 220—3.8)

Outdoor meter socket troughs are made for groups of two to six or more meters. Each meter position is provided with the necessary meter jaws and wire terminals or bus connections together with insulators appropriate to the particular type of meters employed. Each meter position is provided with an individual cover having an opening to receive the meter and a ring to seal it in place. Between the meter positions are cross-channels to receive the juxtaposed flanges of adjacent covers to exclude a beating rain and thereby meet the requirements for rain-tight equipment.

In wiring such troughs it is desirable to lay the conductors (wires or bus-bars) lengthwise of the troughs with connections to the terminals of the sockets at the various meter positions. While prior troughs have been satisfactory for installation of small wire which can readily be bent and threaded under the aforesaid channels, they have not been satisfactory or convenient for installations involving heavy conductors which cannot readily be bent and inserted lengthwise under the aforesaid channel.

Objects of the present invention are to provide a meter trough which is simple and economical in construction, which is durable and reliable in use, which is rain-tight and in which heavy conductors may readily be laid lengthwise of the troughs.

According to the present invention each trough comprises an elongate box having a row of meter positions and an inturned flange along one side of its mouth, a U-shaped channel extending from the aforesaid side to the opposite side intermediate adjacent meter positions, the edges of the channel being directed away from the back of the box approximately at the plane of the aforesaid mouth, a cover for each meter position having side flanges, the covers being slidable under the aforesaid inturned flange with their juxtaposed side flanges extending into the aforesaid channel, with hooks on the ends of the channel and sockets on the sides of the box to receive the hooks, whereby the channel may be removed while laying wires in the trough, by moving the channel away from the aforesaid back to withdraw the hooks from their sockets, the sides of the channel being cut back at the aforesaid one side so as not to interfere with the aforesaid inturned flange in removing the channel. Preferably the aforesaid opposite side of the box has a notch in line with the channel so that the side flanges of the covers extend through the notch into the channel. The aforesaid hooks are preferably formed by extending the bottom of the channel beyond its sides to form a tab at each end, each tab being bent toward the aforesaid back to form a hook. In the preferred embodiment the aforesaid sockets have notches whose edges abut the sides of the channel to hold the channel firmly in position.

For the purpose of illustration a typical embodiment of the invention is shown in the accompanying drawings in which—

Figure 2:
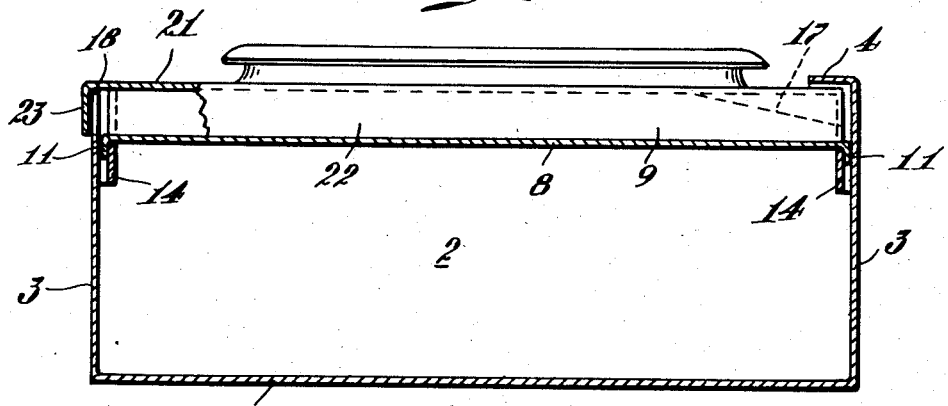
Fig. 2 is a section on line 2—2 of Fig. 1.
Figure 3:
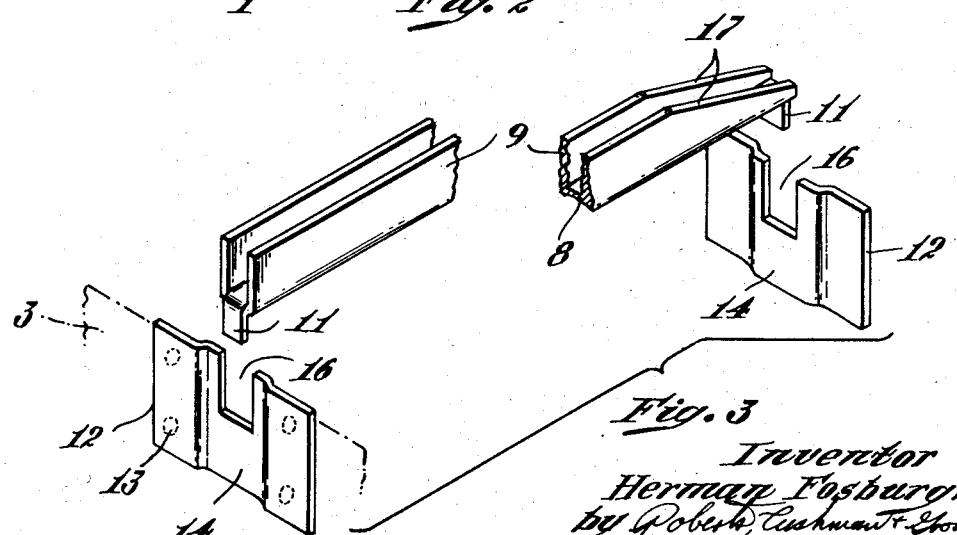
Fig. 3 is an isometric view showing the channel and sockets separated from each other.

The particular embodiment of the invention chosen for the purpose of illustration comprises a box having a back 1, ends 2, sides 3 and an inturned flange 4 extending lengthwise of the trough along one side of its mouth. Bridging the sides of the box between each pair of adjacent meter positions is a channel having a bottom 8 and sides 9. As shown in Figs. 2 and 3 the bottom extends beyond the sides to form tabs 11 at opposite ends of each channel, the tabs being bent at right angles to form hooks which extend into sockets 12 fastened to the sides of the box as by welding as indicated at 13 in Fig. 3. Each socket comprises a strap having its central portion 14 offset inwardly a distance greater than the thickness of the hooks 11. The sockets are provided with notches 16 whose edges abut the sides of the channel to hold the channel firmly in position. The sides 9 of the channel are cut back at one end as indicated at 17 in Figs. 2 and 3 so that the channel may be lifted out of the socket without interference with the flange 4. The side of the box opposite to the flange 4 has a notch 18 in alignment with each of the channels, the depth and width of the notches approximating the corresponding internal dimensions of the channels.

Figure 1:
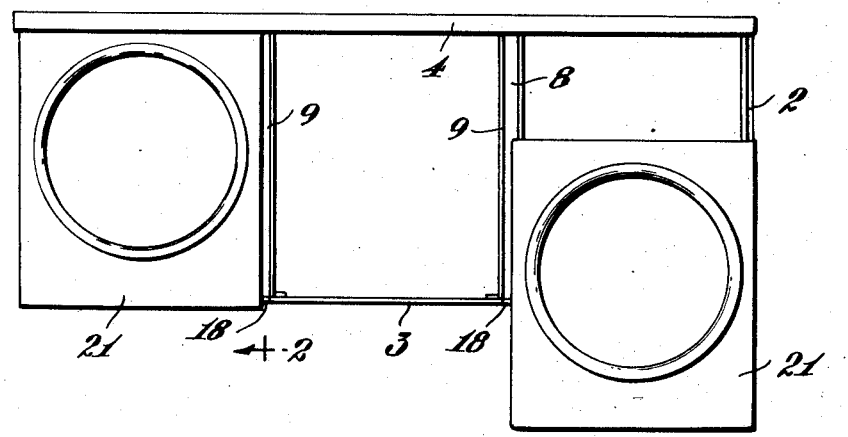
Fig. 1 is a view of a trough from its open side with one cover removed and another cover partially removed.

Each meter position is provided with a cover 21 having side flanges 22 and an end flange 23. As illustrated in Figs. 1 and 2 each cover is slipped transversely of the trough under the flange 4 with the juxtaposed side flanges 22 of adjacent covers extending through the notches 18 into the channels. In Fig. 1 the left-hand cover is fully closed, the middle cover has been removed and the right-hand cover is in position to be slipped under the flange 4.

From the foregoing it will be understood that heavy wires or bus-bars may be laid lengthwise of the box without bending by removing the covers and channels, and removal of the channels also affording freer access to connect the conductors with the socket terminals. At the same time the assembled trough is rigid and rainproof.

It should be understood that the present disclosure is for the purpose of illustration only and that this invention includes all modifications and equivalents which fall within the scope of the appended claims.

I claim:

1. A meter trough comprising an elongate box having a row of meter positions and an inturned flange along one side of its mouth, a U-shaped channel extending from said side to the opposite side intermediate adjacent meter positions, the edges of the channel being directed away from the back of the box approximately at the plane of said mouth, for each meter position a cover having side flanges, the covers being slidable under said inturned flange with their juxtaposed side flanges extending into said channel, hooks on the ends of said channel, and sockets on the sides of the box to receive said hooks, the sockets having notches to receive said channel and said hooks overlapping portions of the sockets to prevent the sides of the box from spreading apart, the sides of the channel being cut back at said one side so as not to interfere with said inturned flange in removing the channel.

2. A meter trough comprising an elongate box having a row of meter positions and an inturned flange along one side of its mouth, a U-shaped channel extending from said side to the opposite side intermediate adjacent meter positions, the edges of the channel being directed away from the back of the box approximately at the plane of said mouth, for each meter position a cover having side flanges, the covers being slidable under said inturned flange with their juxtaposed side flanges extending into said channel, the bottom of the channel extending beyond its sides to form a tab at each end and each tab being bent toward said back to form a hook, and sockets on the sides of the box to receive said hooks, the sockets having notches to receive said channel and said hooks overlapping portions of the sockets to prevent the sides of the box from spreading apart, said sides of the channel being cut back at said one side so as not to interfere with said inturned flange in removing the channel.

3. A meter trough comprising an elongate box having a row of meter positions and an inturned flange along one side of its mouth, a U-shaped channel extending from said side to the opposite side intermediate adjacent meter positions, the edges of the channel being directed away from the back of the box approximately at the plane of said mouth, for each meter position a cover having side flanges, the covers being slidable under said inturned flange with their juxtaposed side flanges extending into said channel, the bottom of the channel extending beyond its sides to form a tab at each end and each tab being bent toward said back to form a hook, and sockets on the sides of the box to receive said hooks, said sockets having notches whose edges abut said sides of the channel, said hooks overlapping portions of said sides to prevent the sides from spreading apart, said sides of the channel being cut back at said one side so as not to interfere with said inturned flange in removing the channel.

4. A meter trough comprising an elongate box having a row of meter positions and an inturned flange along one side of its mouth, a U-shaped channel extending from said side to the opposite side intermediate adjacent meter positions, the edges of the channel being directed away from the back of the box approximately at the plane of said mouth, said opposite side of the box having a notch in line with said channel, for each meter position a cover having side flanges, the covers being slidable under said inturned flange with their juxtaposed side flanges extending into said notch and channel, the bottom of the channel extending beyond its sides to form a tab at each end and each tab being bent toward said back to form a hook, sockets on the sides of the box to receive said hooks, said sockets having notches whose edges abut said sides of the channel, whereby the channel may be removed while laying conductors in the trough by moving the channel away from said back to withdraw said hooks from their sockets, said sides of the channel being cut back at said one side so as not to interfere with said inturned flange in removing the channel.

References Cited in the file of this patent

UNITED STATES PATENTS

| | | |
|---|---|---|
| 1,363,616 | Reddie | Dec. 28, 1920 |
| 2,131,641 | Sachs | Sept. 27, 1938 |
| 2,804,986 | Jeffers et al. | Sept. 3, 1957 |

FOREIGN PATENTS

| | | |
|---|---|---|
| 171,894 | Great Britain | Dec. 1, 1921 |